(12) United States Patent
Kuiken et al.

(10) Patent No.: US 6,922,733 B1
(45) Date of Patent: Jul. 26, 2005

(54) METHOD FOR COORDINATING VISUAL AND SPEECH WEB BROWSERS

(75) Inventors: David Paul Kuiken, Round Rock, TX (US); Mark Daniel Rogalski, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/343,453

(22) Filed: Jun. 30, 1999

(51) Int. Cl.[7] .......................... G06F 15/16; G01L 21/00
(52) U.S. Cl. .................................... 709/246; 704/270.1
(58) Field of Search ........................ 709/246, 203–204; 704/231, 271, 275, 270.1

(56) References Cited

U.S. PATENT DOCUMENTS

| | | | |
|---|---|---|---|
| 5,673,322 A | 9/1997 | Pepe et al. | 380/49 |
| 5,819,220 A | 10/1998 | Sarukkai et al. | 704/243 |
| 6,101,473 A * | 8/2000 | Scott et al. | 704/275 |
| 6,173,316 B1 * | 1/2001 | De Boor et al. | 709/218 |
| 6,175,562 B1 * | 1/2001 | Cave | 370/352 |
| 6,243,676 B1 * | 6/2001 | Witteman | 704/243 |

OTHER PUBLICATIONS

Collin, "Servers to Enhance Your Site, Chapter 9: Push Servers". Setting Up a Web Server. 1997.*

* cited by examiner

Primary Examiner—Larry D. Donaghue
(74) Attorney, Agent, or Firm—Duke W. Yee; David A. Mims, Jr.; Lisa L. B. Yociss (57) ABSTRACT

A method of accessing information on a distributed database. In a preferred embodiment, a proxy server receives a request for information from a client machine. The proxy server retrieves the information from the distributed database. The proxy server separates the information into an audio component and a visual component, and sends the audio component to an audio browser located on a client machine, and sends the visual component to a visual browser located on the client machine, thereby providing integrated speech and visual browsing.

25 Claims, 5 Drawing Sheets

R
```
<HTML>
<BODY>
Shoe catalog:
<IMG src=hiking.gif>
<A href=hiking>Hiking</A>
<IMG src=work.gif>
<A href=work>Work</A>
<IMG src=tennis.gif>
<A href=tennis>Tennis</A>
</BODY>
</HTML>
```
FIG. 8A R'
```
<SML>
<MENU>
<CHOICE target=hiking>
Hiking</CHOICE>
<CHOICE target=work>
Work</CHOICE>
<CHOICE target=tennis>
Tennis</CHOICE>
</MENU>
</SML>
```
FIG. 8B R"
```
<HTML>
<BODY>
Shoe catalog:
<IMG scr=hiking.gif>
<A href=hiking>Hiking</A>
<IMG src=work.gif>
<A href=work>Work</A>
<IMG scr=tennis.gif>
<A href=tennis>Tennis</A>
</BODY>
</HTML>
```
FIG. 8C

METHOD FOR COORDINATING VISUAL AND SPEECH WEB BROWSERS

BACKGROUND OF THE INVENTION

1. Technical Field

The present invention relates generally to computer software and, more specifically, to methods for accessing information via the Internet. Even more specifically, the present invention relates to coordinating speech and visual web browsers.

2. Description of Related Art

The Internet is a global network interconnecting the computer networks of universities, private organizations, corporations, and governments, as well as individual's computers. One segment of the Internet is referred to as the World Wide Web (WWW) or simply 'the Web.' One description for the WWW is a "wide-area hypermedia information retrieval initiative aiming to give universal access to a large universe of documents."

As the WWW and Internet grow, and more information becomes available through them, they become increasingly more important to corporations and individuals alike. Furthermore, the WWW is proving to be an extremely valuable resource for corporate enterprises for communicating via electronic mail (e-mail), for accessing information on-line, etc.

Currently, information on the WWW and Internet is typically accessed by means of web browsers, such as Netscape's Navigator and Microsoft's Internet Explorer. These web browsers typically employ a Hyper Text Transport Protocol (HTTP) to transfer Hyper Text Markup Language (HTML) documents from a web server to a client data processing system.

Most of these web browsers are visual in character. That is, information is provided to a user via a visual display, and requests for information are entered by typing or otherwise manipulating the display using a pointer positioning device, such as a mouse. However, a more recent method of accessing information via the Internet or WWW is the use of speech browsers. Speech browsers speak the content of a web page and then listen for user commands in order to direct the browser to make additional page requests. One markup language understood by speech browsers is Speech Markup Language (SML). It describes what should be spoken and how to speak it, and also what user commands should be listened for. Audio information contained on a web site is returned to the speech browser and broadcast to the user via an audio speaker.

Currently, visual web browsers do not have integrated speech recognition, and speech recognition engines cannot be used to navigate visual web pages. However, personal digital assistants and other similar devices are becoming more popular, and people are desiring to access the Internet and WWW from a wider variety of places where full-size computers with keyboards are not available or feasible. Therefore, the need to integrate speech browsers with visual browsers, so that visual information can be displayed in response to oral requests, becomes more and more important. However, this is likely to be an expensive and time-consuming endeavor. Therefore, it is desirable to have a method of rapidly providing a basic level of coordination between existing visual and speech browsers.

SUMMARY OF THE INVENTION

The present invention provides a method of accessing information on a distributed database. In a preferred embodiment, a proxy server receives a request for information from a client machine. The proxy server retrieves the information from the distributed database. The proxy server separates the information into an audio component and a visual component. It then sends the audio component to an audio browser located on a client machine, and sends the visual component to a visual browser located on the client machine.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
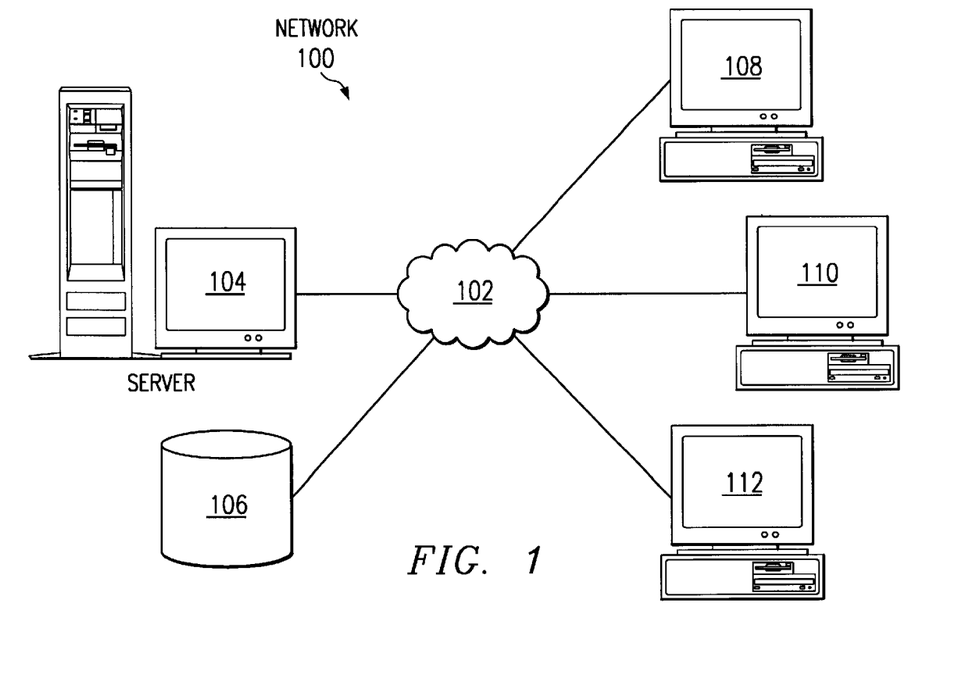
FIG. 1 depicts a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, server 104 is connected to network 102, along with storage unit 106. In addition, clients 108, 110 and 112 are also connected to network 102. These clients, 108, 110 and 112, may be, for example, personal computers or network computers. For purposes of this application, a network computer is any computer coupled to a network, which receives a program or other application from another computer coupled to the network. In the depicted example, server 104 provides data, such as boot files, operating system images, and applications, to clients 108–112. Clients 108, 110 and 112 are clients to server 104. Distributed data processing system 100 may include additional servers, clients, and other devices not shown.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communications lines between major nodes or host computers consisting of thousands of commercial, government, education, and other computer systems that route data and messages. Of course, distributed data processing system 100 also may be implemented as a number of different types of networks, such as, for example, an intranet, the Internet, the World Wide Web, or a local area network.

FIG. 1 is intended as an example and not as an architectural limitation for the processes of the present invention.

Figure 2:
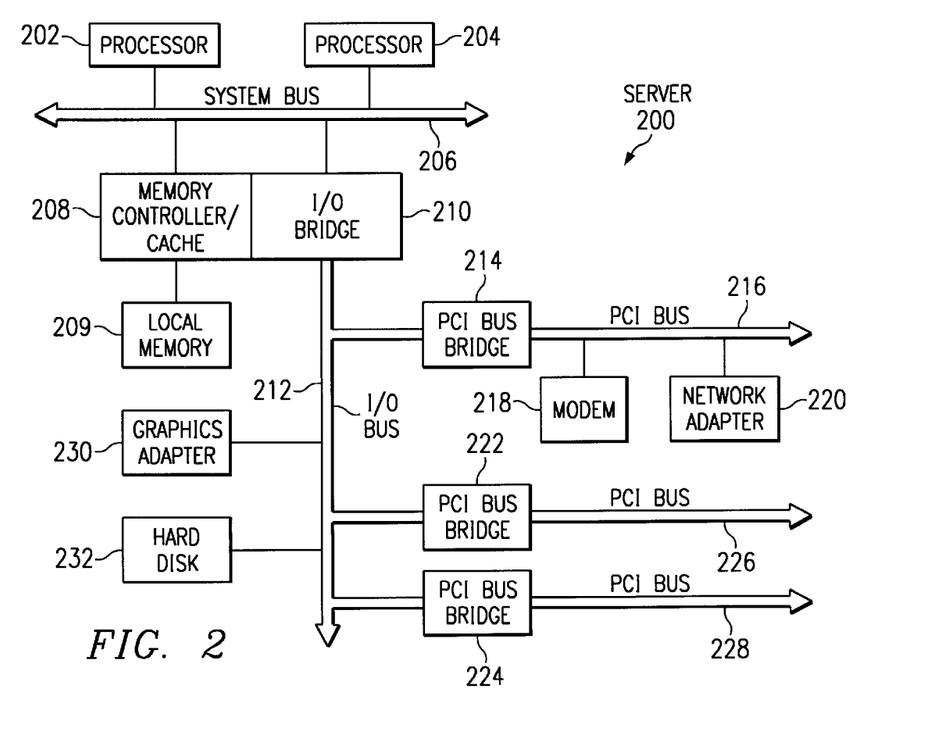
FIG. 2 depicts a block diagram of a data processing system that may be implemented as a server in accordance with the present invention.

Referring to FIG. 2, a block diagram of a data processing system which may be implemented as a server, such as server 104 in FIG. 1, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000, a product of International Business Machines Corporation in Armonk, N.Y., running the Advanced Interactive Executive (AIX) operating system.

Figure 3:
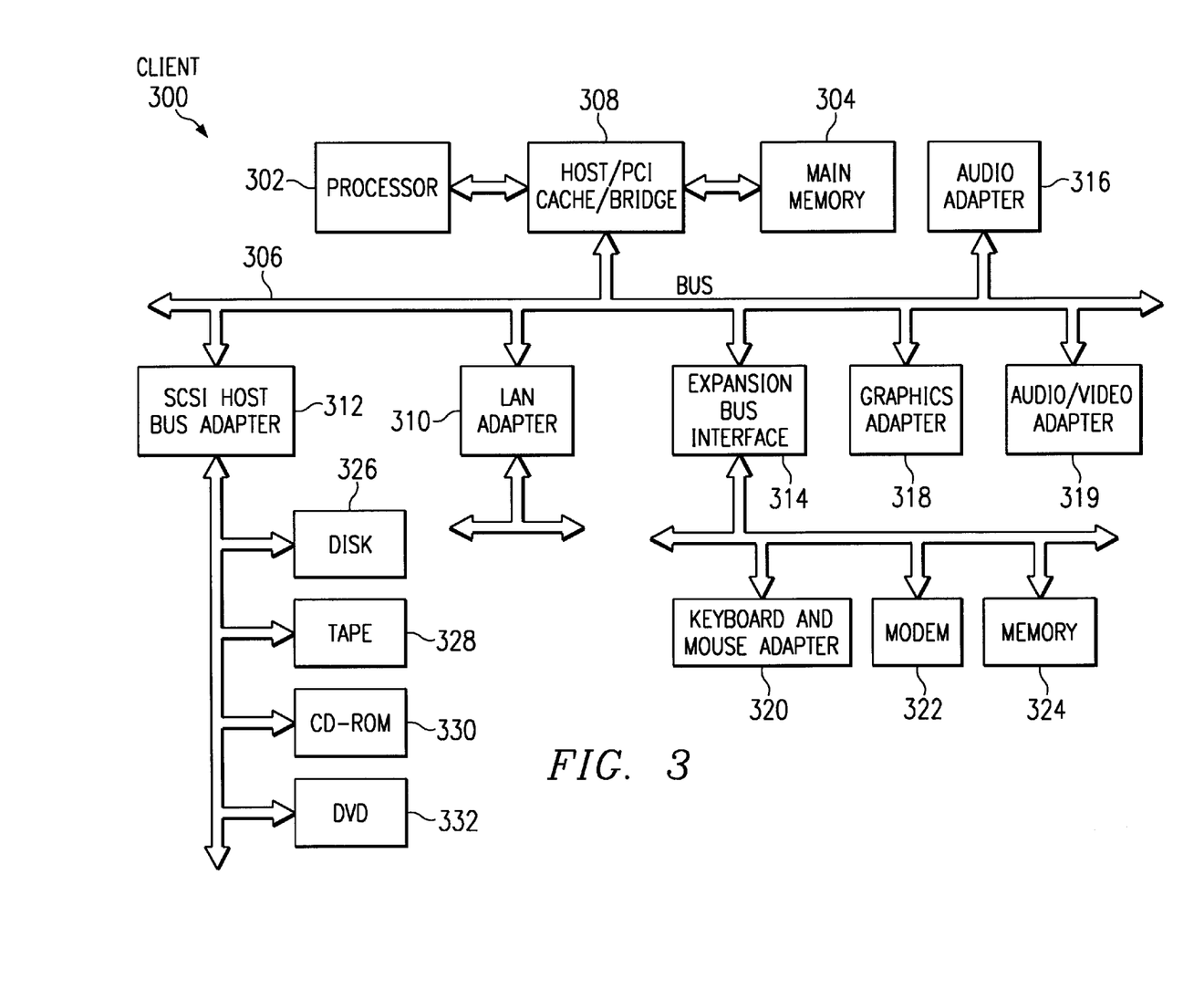
FIG. 3 depicts a block diagram of a data processing system in which the present invention may be implemented.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as OS/2, which is available from International Business Machines Corporation. "OS/2" is a trademark of International Business Machines Corporation. An object oriented programming system, such as Java, may run in conjunction with the operating system, providing calls to the operating system from Java programs or applications executing on data processing system 300. Instructions for the operating system, the object-oriented operating system, and applications or programs are located on a storage device, such as hard disk drive 326, and may be loaded into main memory 304 for execution by processor 302.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

Figure 4:
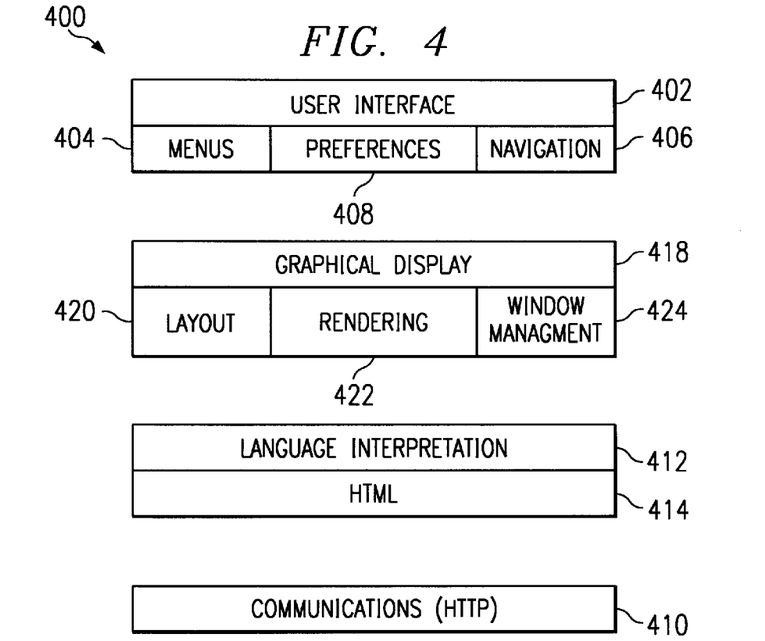
FIG. 4 depicts a block diagram of a visual web browser program in accordance with a preferred embodiment of the present invention.

Turning next to FIG. 4, a block diagram of a visual web browser program is depicted in accordance with a preferred embodiment of the present invention. Browser 400 includes a user interface 402, which is a graphical user interface (GUI) that allows the user to interface or communicate with browser 400. This interface provides for selection of various functions through menus 404, and allows for navigation through navigation button 406 or selections. For example, menus 404 may allow a user to perform various functions, such as saving a file, opening a new window, displaying a history, and entering a universal resource locator (URL). Navigation 406 allows a user to navigate various pages and to select web sites for viewing. For example, navigation 406 may allow a user to see a previous page or a subsequent page relative to the present page. Preferences may be set through preferences 408.

Communications 410 is the mechanism with which browser 400 receives documents and other resources from a network, such as the Internet. Further, communications 410 is used to send or upload documents and resources onto a network. In the depicted example, communication 410 uses HTTP. However, other protocols are possible. Documents that are received by browser 400 are processed by language interpretation 412, which includes an HTML unit 414. Language interpretation 412 will process a document for presentation on graphical display 418. In particular, HTML statements are processed by HTML unit 414 for presentation.

Graphical display 418 includes layout unit 420, rendering unit 422, and window management 424. These units are involved in presenting web pages to a user based on results from language interpretation 412.

Browser 400 is presented as an example of a browser program in which the present invention may be embodied. Browser 400 is not meant to imply architectural limitations to the present invention. Presently, available browsers may include additional functions not shown or may omit functions shown in browser 400. As used herein, the term "browser" encompasses any software application used to view or navigate for information or data (e.g., something that assists a user to browse) in a distributed database, where the distributed database is typically the Internet or World Wide Web.

Figure 5:
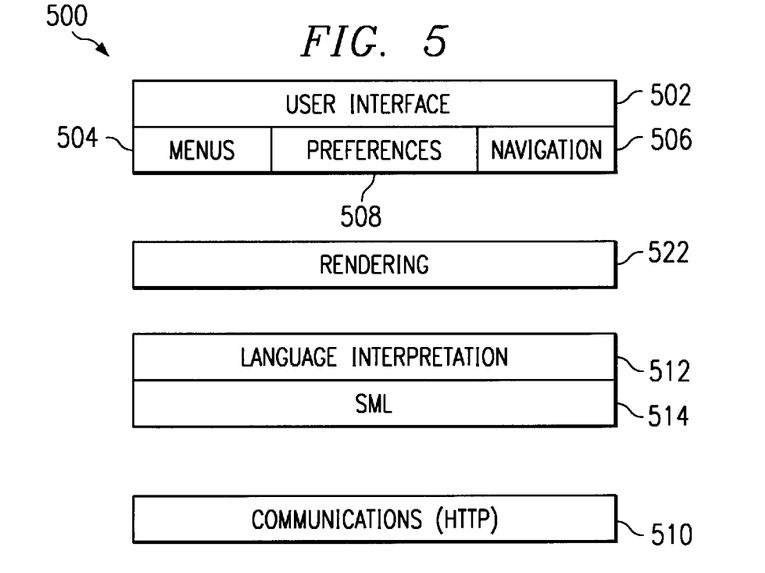
FIG. 5 depicts a block diagram of a speech web browser program in accordance with a preferred embodiment of the present invention.

Turning next to FIG. 5, a block diagram of a speech web browser program is depicted in accordance with a preferred embodiment of the present invention. Browser 500 includes a user interface 502, which is an audio user interface that allows the user to interface or communicate with browser 500. This interface provides for selection of various functions through audio menus 504, and enables navigation through audible selections received by navigation unit 506. For example, menu 504 may allow a user to perform various functions, such as saving a file, audibly listing a history, and entering a URL. Navigation 506 allows a user to navigate various pages and to select web sites for listening. For example, navigation 506 may allow a user to listen to a previous page or a subsequent page relative to the present page. Preferences may be set through preferences 508.

Communications 510 is the mechanism with which browser 500 receives documents and other resources from a network, such as the Internet. Further, communications 510 is used to send or upload documents and resources onto a network. In the depicted example, communications 510 uses HTTP. However, other protocols are possible. Documents that are received by browser 500 are processed by language interpretation 512, which includes SML unit 514. Language interpretation 512 will process a document for presentation on speaker 518. In particular, SML statements are processed by SML unit 514 for presentation.

Browser 500 is presented as an example of a browser program in which the present invention may be embodied. Browser 500 is not meant to imply architectural limitations to the present invention. Presently available browsers may include additional functions not shown or may omit functions shown in browser 500. As used herein, the term "browser" encompasses any software application used to listen to or navigate for information or data (i.e., something that assists a user in browsing) in a distributed database where the distributed database is typically the Internet or World Wide Web.

Figure 6:
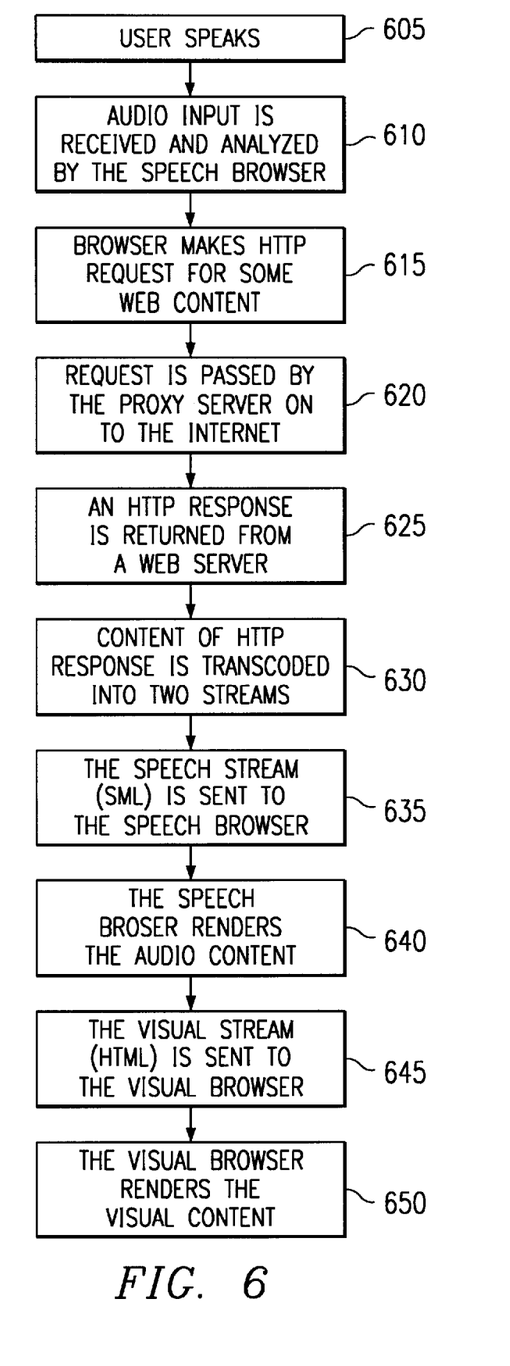
FIG. 6 illustrates a flow chart for implementing the methods of the present invention.
Figure 7:
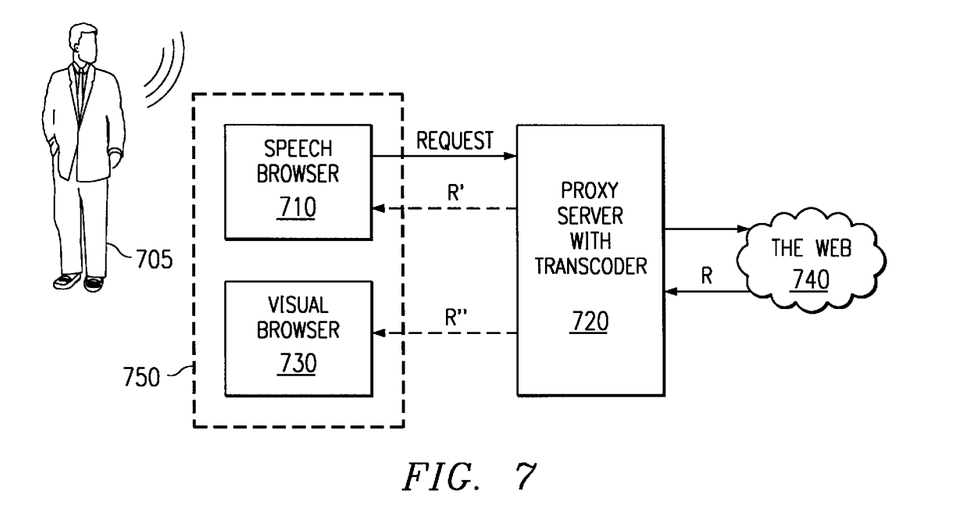
FIG. 7 illustrates a block diagram of the relations between various components used in implementing the present invention.

Turning now to FIGS. 6 and 7, the methods of the present invention are described. FIG. 6 illustrates a flowchart for implementing the methods of the present invention. FIG. 7 illustrates a block diagram of the relations between various components used in implementing the present invention. A user 705 of a data processing system 750 speaks into a microphone (step 605). An example of a data processing system suitable for use as data processing system 750 is client 300 (in FIG. 3). However, data processing system 750 could be any of a number of devices, including personal computers, laptop computers, and personal digital assistants (PDAs). The audio input from user 705 is received and analyzed by a speech browser 710 within data processing system 750 (step 610). An example of a speech browser suitable for use as speech browser 710 is browser 500 (in FIG. 5). However, other speech browsers may also be used, as will be obvious to those skilled in the art.

Speech browser 710 makes a Hyper Text Transfer Protocol (HTTP) request to proxy server 720 for particular web content (step 615). Proxy server 720 could be, for example, a server such as server 200 (in FIG. 2). However, other types of servers may be used as proxy server 720, as will be obvious to those skilled in the art. Proxy server 720 includes a transcoder for separating the visual component of an HTTP response from an audio component of an HTTP response. The request for particular web content is passed on to Web 740 by proxy server 720 (step 620). An HTTP response R is returned from a web server to proxy server 720 (step 625).

The content of the HTTP response is transcoded into two components by the transcoder within proxy server 720 (step 630). One component contains speech and audio component R' of response R received from the web. The other component contains visual component R" of response R received from the web. The original content from the web can be in any format, such as, for example, Hyper Text Markup Language (HTML), XML, or any proprietary format. In any case, the transcoder is programmed to deal with the original content in order to produce an HTML (or XML, or some other format) visual stream and a Speech Markup Language (SML), or some other format audio stream. The transcoder creates an SML stream from a standard HTML (or other protocol) document by generating an SML speech choice for each link in the HTML document. It should be noted, however, that the transcoder may perform other functions in addition to those described herein. Furthermore, the internal operations of transcoders are well known to those skilled in the art. Proxy server 720 then sends the speech or audio component R' of response R to speech browser 710 (step 635). The speech browser renders the audio content so that it can be heard by user 705 (step 640). The visual component R" of response R is sent to visual browser 730 (step 645). Visual browser 730 renders the visual content and displays it on a screen for viewing by user 705 (step 650). If there is no open visual browser 730 connection, the visual component is discarded. If there is an open visual browser 730, but the transcoder determines that no server-push visual connection currently exists, the HTTP response is modified to open one, and then the HTML (or other protocol) component is sent to visual browser 730. Thus, speech browser 710 is, effectively, in control of what is displayed on visual browser 730. An example of a browser suitable for use as visual browser 730 is browser 400 (in FIG. 4). However, other browsers could be used as well, as will be obvious to those skilled in the art.

Figure 8A:
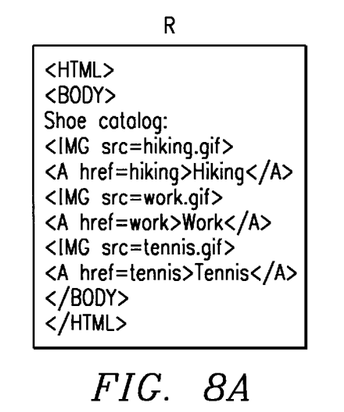
FIGS. 8A–8C depict examples of the stream content of the response R from the web, the modified speech stream response R', and the modified visual stream response R".
Figure 8B:
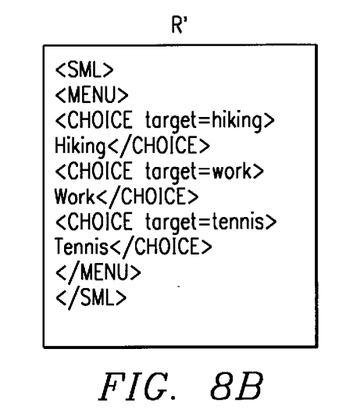
Figure 8C:
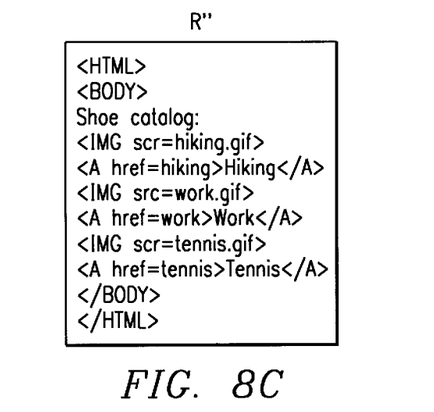

FIGS. 8A–8C depict examples of the stream content of the response R from the Web, the modified speech stream response R', and the modified visual stream response R". FIG. 8A shows the original HTML content of the response from the Web. FIG. 8B shows the speech stream of SML R' after transcoding by proxy server 720 (step 635). When speech stream R' is rendered by speech browser 710, three shoe types are spoken by the computer: hiking, work, and tennis. FIG. 8C shows the visual stream of HTML R" after transcoding by proxy server 720 (step 645). When visual stream R" is rendered by visual browser 730, three shoe images are displayed. Although the transcoder may create new HTML or modify HTML from the original document, in this case, the HTML is passed straight through without need of modification.

The following example will aid in understanding the methods of the present invention. An initial script or program starts both a speech browser and a visual browser and points them to a home page. The user speaks into a microphone a request for web content, which is translated into an appropriate protocol by a speech recognition engine within speech browser 710. Transcoding proxy server 720 receives the request and retrieves the appropriate page from Web 740. Transcoding proxy server 720 performs the split between the visual and speech components of the received page (step 630). The transcoder sends the SML component to speech browser 710 and the speech browser speaks, "hiking, work, tennis" (step 640).

The transcoder sends the visual component of the Web response to visual browser 730 (step 645). Visual browser 730 receives the visual component and displays images of a hiking boot, work shoe, and tennis shoe (step 650).

The user speaks the word "hiking." The speech engine within speech browser 710 matches the phrase and requests a new web page. Transcoding proxy server 720 retrieves the page and again performs the visual/speech split (step 630). The transcoder sends the SML component to the speech browser (step 635). As there is now an open visual browser connection, the visual component is pushed to the visual browser (step 645).

It should be noted that speech browser 710 and visual browser 730 are not required to be "aware" of each other or to communicate directly with each other. There is no communication between browsers 710 and 730. Transcoding proxy server 720 provides all necessary coordination between browsers 710 and 730. It should also be noted that no modifications to existing browsers need be made in order to implement the methods of the present invention. Furthermore, while the present invention has been described with reference to speech browser 710 controlling the display of a visual browser 730, the methods of the present invention could be applied in reverse, such that visual browser 730 is in control of the audio output of speech browser 710.

In an alternate embodiment, speech browser 710 and visual browser 730 are embedded in-a single integrated web browser. Such an embodiment could be accomplished by a direct modification of code to an existing web browser, such as Netscape's Navigator or Microsoft's Internet Explorer, or as a plug-in to an existing browser. The integrated web browser would receive both visual stream R" and speech stream R', and send each stream to the appropriate section of the integrated web browser.

In a modification to the integrated web browser, the function of transcoding the information R received from the Web into a visual stream R" and a speech stream R' could be performed within the integrated web browser rather than on proxy server 720. In this case, each stream R' and R" would be sent to the appropriate component within the integrated web browser, which contains both a speech browser component and a visual browser component.

The connections between data processing system 750, proxy server 720, and Web 740 may be accomplished via wire connections, possibly utilizing intermediate servers or data processing systems. Furthermore, various connections between these components may be via wireless communication, such as satellite.

Furthermore, it is important to note that, while the present invention has been described in the context of a fully functioning data processing system, those of ordinary skill in the art will appreciate that the processes of the present invention are capable of being distributed in the form of a computer readable medium of instructions and a variety of forms, and that the present invention applies equally regardless of the particular type of signal bearing media actually used to carry out the distribution. Examples of computer readable media include recordable-type media, such floppy discs, hard disk drives, RAM, and CD-ROMs and transmission-type media, such as digital and analog communications links. The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of accessing information in a distributed database, comprising the steps of:
    receiving a request for information at a proxy server;
    retrieving, by said proxy server, the information from the distributed database;
    separating the information, by said proxy server, into an audio component and a visual component;
    sending, by said proxy server, the audio component to a speech browser on a client machine; and
    sending, by said proxy server, the visual component to a visual browser on the client machine.

2. The method as recited in claim 1, wherein the request is received from the speech browser located on the client machine.

3. The method as recited in claim 1, wherein the request is received from the visual browser located on the client machine.

4. The method as recited in claim 1, wherein the distributed database is distributed within a wide area network.

5. The method as recited in claim 1, wherein the client machine is at least one of a computer, a portable computer, and a personal digital assistant.

6. The method as recited in claim 1, further comprising sending the request from a client machine via a wireless modem.

7. The method as recited in claim 1, further comprising opening a server-push connection between the proxy server and the visual browser.

8. The method as recited in claim 1, further comprising opening a server-push connection between the proxy server and the speech browser.

9. The method as recited in claim 1, wherein the speech browser comprises a speech recognition engine that facilitates sending the request to the proxy server, wherein the request is a spoken request.

10. The method as recited in claim 1, wherein the speech browser and the visual browser are integrated into a single unified browser, wherein the speech browser provides speech browsing capabilities, and the visual browser provides visual browsing capabilities.

11. A computer software product in computer readable medium for accessing information in a distributed database, the computer software product comprising:
    first instructions for receiving a request for information at a proxy server;

second instructions for retrieving, by said proxy server, the information from the distributed database;

third instructions for separating, by said proxy server, the information into an audio component and a visual component;

fourth instructions for sending, by said proxy server, the audio component to a speech browser on a client machine; and fifth instructions for sending, by said proxy server, the visual component to a visual browser on the client machine.

12. The computer software product as recited in claim 11, further comprising sixth instructions for opening a server-push connection between the proxy server and the audio browser.

13. The computer software product as recited in claim 11, further comprising sixth instructions for opening a server-push connection between the proxy server and the video browser.

14. The computer software product as recited in claim 11, further comprising:

sixth instructions for receiving the request from the speech browser located on the client machine.

15. The computer software product as recited in claim 11, further comprising:

sixth instructions for receiving the request from the visual browser located on the client machine.

16. A system for accessing information in a distributed database, the system comprising:

means for receiving a request for information at a proxy server;

said proxy server for retrieving the information from the distributed database;

said proxy server for separating the information into an audio component and a visual component;

said proxy server for sending the audio component to a speech browser on a client machine; and said proxy server for sending the visual component to a visual browser on the client machine.

17. The system as recited in claim 16, further comprising means for opening a server-push connection between the proxy server and the audio browser.

18. The system as recited in claim 16, further comprising:

means for sending the request from the client machine via a wireless modem.

19. The system as recited in claim 16, further comprising means for receiving the request via a wireless modem.

20. A method of accessing information in a distributed database, comprising the steps of:

sending a request for information to be retrieved from a distributed database to a proxy server;

retrieving, by said proxy server, the information from the distributed database;

separating, by said proxy server, the information into an audio component and a visual component;

sending, by said proxy server, the audio component to a first component of a browser; and sending, by said proxy server, the visual component to a second component of the browser.

21. The method as recited in claim 20, wherein said separating step is performed on said proxy server prior to receipt of the information by the browser.

22. The method of claim 1, wherein the information is a Hyper Text Markup Language document.

23. The method of claim 1, wherein the visual component is a Hyper Text Markup Language document.

24. The method of claim 1, wherein the audio component is a Speech Markup Language document.

25. The method of claim 24, wherein the speech browser speaks the Speech Markup Language document.

* * * * *